Patented Nov. 6, 1923.

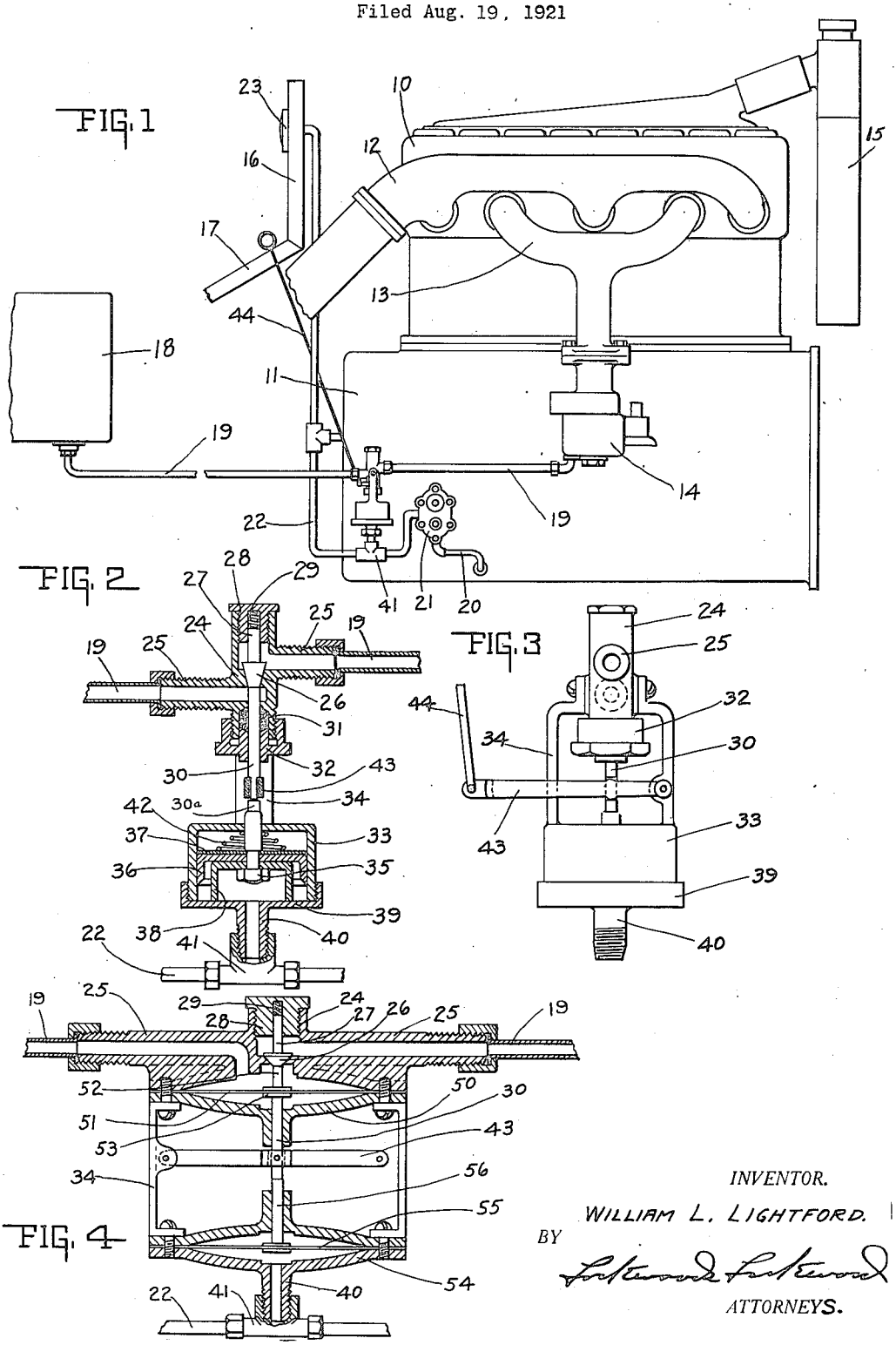

1,473,303

UNITED STATES PATENT OFFICE.

WILLIAM L. LIGHTFORD, OF INDIANAPOLIS, INDIANA.

FUEL CONTROL FOR INTERNAL-COMBUSTION ENGINES.

Application filed August 19, 1921. Serial No. 493,752.

*To all whom it may concern:*

Be it known that I, WILLIAM L. LIGHTFORD, a citizen of the United States, and a resident of Indianapolis, county of Marion, and State of Indiana, have invented a certain new and useful Fuel Control for Internal-Combustion Engines; and I do hereby declare that the following is a full, clear, and exact description thereof, reference being had to the accompanying drawings, in which like numerals refer to like parts.

This invention relates to a device for controlling the fuel line of an internal combustion engine by the pressure of the lubricating oil therefor, whereby the fuel will be cut off and the engine caused to cease operating when the oil pressure falls below a predetermined point, so as to prevent burning out the bearings.

The main object of the invention is to provide a safety device to indicate to the operator of the engine, in a very positive manner, that the lubricating oil contained therein is too low for the proper lubrication thereof, or that the oil pump is not properly functioning for pumping the oil through the engine, or that there is some obstruction in the oil line. In case of any of the above contingencies, it is dangerous to continue the operation of the engine, as the lack of sufficient oil or pressure for causing the proper lubrication thereof will burn out the bearings.

The main feature of this invention resides in the manner of actuating the fuel line cut-off valve by the low pressure so that there can be no intermingling of the oil with the fuel in case parts of the device become broken or caused to leak. To this end the fuel control valve is separated from the oil control, and an intermediate connection provided for controlling said valve by the oil pressure.

Another feature of the invention resides in the emergency means for continuing the operation of the engine after it has been stopped by closing the fuel line, whereby the operator may manually reopen the fuel line so as to cause the engine to continue work until such time as it may be more conveniently stopped. For instance, in case an engine is used for propelling a motor vehicle, when the fuel line would be closed by means of the device, the operator could manually cause the fuel line to be reopened, so that the engine would continue to propel the vehicle to a more suitable place for stopping and looking after the difficulties arising from the lubricating system.

The full nature of the invention will be understood from the accompanying drawings and the following description and claims.

In the drawings, Fig. 1, is a side elevation of an internal combustion engine mounted in a motor vehicle, only parts of which are shown herein, with the safety device mounted thereon. Fig. 2 is a central vertical section through the safety device. Fig. 3 is a side elevation thereof. Fig. 4 is a central vertical section through a modified form.

In the drawings, there is shown an internal combustion engine comprising a cylinder block 10 mounted on a crank case 11 having an exhaust manifold 12, intake manifold 13 and carbureter 14 supported in a motor vehicle, of which only the radiator 15, instrument board 16 and foot board 17 are shown. In the vehicle there is mounted the usual fuel tank 18 connected with the carbureter 14 by a fuel line 19. For the lubrication of the engine there is used what is commonly known as the pressure oil system wherein the oil contained in the bottom of the crank case is drawn out through the oil line 20 by an oil pump 21 mounted thereon, and pumped through the oil line 22 into the crank shaft through which it is forced under pressure and caused to lubricate the bearings through oil ports therein. The oil line also is connected to a pressure gauge 23 on the instrument board of the vehicle so that the operator can observe the oil pressure.

At any time that the oil pressure falls below a predetermined point, during the operation of the engine, there is danger that the bearings are not being sufficiently lubricated, which will cause them to burn out. This may be caused by an insufficient supply of lubricating oil in the crank case, the breaking down of the pump or valves, or an obstruction in the oil line. While the pressure gauge is for the purpose of warning the operator of this condition, there is also danger that it will not be observed and that the oil will not be under the necessary pressure while the operator continues to run the engine without knowledge of the condition. The above described construction is of the usual well known type and commonly employed in connection with many internal combustion engines.

The safety device for stopping the engine upon the reduction of the oil pressure comprises a valve housing 24 having oppositely extending and internally threaded nipples 25 adapted to be connected with the fuel line 19, whereby the fuel passing from the tank 18 to the carbureter 14 must pass through said housing. Contained in the housing there is a tapered valve 26 adapted to seat in the fuel line passage for opening and closing said passage and shutting off the fuel when in closed position. The valve is mounted upon a valve stem 27 and adapted to reciprocate in a cap 28 and engage a spring 29 which is arranged to normally hold the valve in closed position. Upon the opposite end of the valve from the stem 27, there is a valve actuating plunger 30 adapted to extend through packing 31 and packing cup 32. The valve housing 24 is connected with a cylinder 33 by the side brackets 34, whereby the valve housing and the cylinder 33 are held in fixed relation to each other.

The plunger 30ª extends into the cylinder 33 through the closed end thereof and is rigidly secured by a nut 35 to a piston 36, washer 37 and spacer 38. Secured over the open end of the cylinder 33 there is a cylinder head 39 having a nipple 40 thereon to which is secured a T 41 for connecting said cylinder with the oil line 32. Mounted between the closed end of the cylinder 33 and washer 37 there is a helical spring 42 for normally maintaining the piston and spacer 38 in the position shown in Fig. 2, wherein the valve 26 will be closed.

The operation of the device is as follows: When the oil pressure is sufficient to properly lubricate the engine, such pressure is exerted against the piston 36 by its communication therewith through the oil line 22, T 41 and nipple 40. This pressure overcomes the spring 42 and forces the piston inwardly in said cylinder, causing the plunger 30ª to push the valve 26 out of seating engagement with the tapered seat in the fuel line passage by the plunger 30, thereby opening said passageway through the fuel line 19 and permitting the proper operation of the engine. Should the oil pressure be reduced below the pressure necessary for proper lubrication of the engine, the springs 39 and 42 will cause the piston 36 to return to normal position and the valve 26 to close, thereby closing the fuel line and preventing further operation of the engine. The spacer 38 is for the purpose of reinforcing the piston 36 and limiting the movement thereof by spacing the same from the cap 39. In order to permit fuel to pass to the engine, in starting there is provided a manually-operated lever 43 which is pivoted at one end to brackets 34 and embraces and engages the plunger 30 at its reduced portion. By means of this lever which has a connection with the vehicle through a rod 44, the operator can open the valve manually when there is not sufficient oil pressure to do so automatically. The manual means for opening the fuel line may also be employed when oil pressure fails to open the valve and it is necessary to operate the engine without sufficient lubrication.

The modified form, shown in Fig. 4, consists of a diaphragm housing 50 arranged to be secured to the valve housing 24 in which is contained a diaphragm 51 positioned so as to control the operation of the valve 26 by a pin 52. The diaphragm is reinforced by the oppositely-mounted plates 53 in the center thereof against which the plunger 30 operates. This diaphragm is to take the place of the packing 31. In place of the cylinder 33 there is provided a diaphragm housing 54 containing a diaphragm 55 in engagement with a pin 56 which abuts the end of the plunger 30, whereby the movement of the diaphragm 55 will cause a similar movement of the diaphragm 51 and the consequent action of the valve 26. The operation of this modified form is substantially the same as above described, the oil exerting a pressure against the diaphragm 55 which communicates the movement caused thereby to the diaphragm 51 which causes the opening, or permits the closing of the valve 26.

By means of this arrangement the fuel line will be controlled by the pressure of the oil in the lubricating system and there will be no way in which the oil can reach the fuel in event that there is leakage in the diaphragm, packing or cylinder.

The invention claimed is:

1. The combination with an internal combustion engine having a pressure feed oiling system therefor, an oil line, and an oil pump for producing pressure therein, of a fuel line for supplying fuel to said engine, a valve in said fuel line, a stem upon which said valve is mounted, a cylinder into which said stem is adapted to extend, a piston positioned on said stem, and an oil pressure line connected with said cylinder whereby the pressure exerted by said oil will operate said piston for opening said valve.

2. The combination with an internal combustion engine having a pressure feed oiling system therefor, an oil line, and an oil pump for producing pressure therein, of a fuel line for supplying fuel to said engine, a valve in said fuel line, a stem upon which said valve is mounted, a cylinder into which said stem is adapted to extend, a piston positioned on said stem, an oil pressure line connected with said cylinder whereby the pressure exerted by said oil will operate said piston for opening said valve, and means positioned between one end of said cylinder and said piston for closing said valve upon the pressure being reduced.

3. The combination with an internal combustion engine having a pressure feed oiling system therefor, an oil line, an oil pump for producing pressure therein, of a fuel line for supplying fuel to said engine, a valve in said fuel line, a stem upon which said valve is mounted, a cylinder into which said stem is adapted to extend, a piston positioned on said stem, an oil pressure line connected with said cylinder whereby the pressure exerted by said oil will operate said piston for opening said valve, and a spacing member positioned between said piston and the closure for said cylinder for limiting the movement of said piston and valve.

In witness whereof, I have hereunto affixed my signature.

WILLIAM L. LIGHTFORD.